United States Patent [19]

Firdaus

[11] Patent Number: 5,794,306
[45] Date of Patent: Aug. 18, 1998

[54] YARD CARE MACHINE VACUUM HEAD

[75] Inventor: Usman Firdaus, Strongsville, Ohio

[73] Assignee: Mid Products, Inc., Cleveland, Ohio

[21] Appl. No.: 657,331

[22] Filed: Jun. 3, 1996

[51] Int. Cl.[6] .................................................. A47L 9/02
[52] U.S. Cl. .......................... 15/418; 15/340.2; 15/422.1
[58] Field of Search .............................. 15/330, 340.2, 15/415.1, 418, 419, 422.1; 56/13.1, DIG. 8

[56] References Cited

U.S. PATENT DOCUMENTS

| | | | |
|---|---|---|---|
| 3,089,178 | 5/1963 | Sherman | 15/418 |
| 3,112,511 | 12/1963 | Lankenau | 15/415.1 |
| 3,491,339 | 1/1970 | Dolan et al. | 15/418 |
| 3,862,469 | 1/1975 | Burgoon | 15/418 |
| 5,231,827 | 8/1993 | Connolly et al. | 56/DIG. 8 |

*Primary Examiner*—Terrence Till
*Attorney, Agent, or Firm*—Emerson & Associates; Roger D. Emerson

[57] ABSTRACT

An asymmetric opening at the bottom of a lawn and garden vacuum device equalizing the suction across the lateral width thereof.

10 Claims, 6 Drawing Sheets

YARD CARE MACHINE VACUUM HEAD

FIELD OF THE INVENTION

This invention relates to a vacuum head to be used on yard care vacuum machines and ground debris collection systems and other flat surface care equipment.

BACKGROUND OF THE INVENTION

Vacuum heads have been utilized with vacuums and sweepers for a significant period of time. Typically, there is a lateral opening in the bottom section of a formed plastic or steel head interconnected with some sort of fan or vacuum mechanism. A typical example is the MTD Yard Machines multi-vac Model 685, which multi-vac includes a 30 inch vacuum nozzle for use in vacuuming the operator's lawn, cement/driveways, and such. While this type of multi-vac device is functional, there is typically a mal distribution or a divergence in the suction along the lateral opening for the vacuum head. The reason for this is that the incoming air chooses the path of least resistance, a path typically centered vacuum source, normally near the middle of the vacuum head, with lesser suction at the spaced side lateral ends of the vacuum head. This suction divergence can, under certain operating conditions, produce an uneven vacuuming effect—thus reducing the effective lateral width of the vacuum nozzle and/or requiring multiple offset passes for a set level of vacuuming.

OBJECTS AND SUMMARY OF THE INVENTION

It is an object of the present invention to equalize the suction in a vacuum head for suction-type machines.

It is another object of the present invention to improve the operating efficiency of devices incorporating vacuum heads.

It is yet another object of the present invention to increase the usability of vacuum systems.

It is still another object of the present invention to increase the efficiency of vacuum systems.

It is yet a further object of the present invention to increase the control over the amount of suction in devices using a vacuum head.

Other objects and a more complete understanding of the invention may be had by referring to the following description and drawing in which:

BRIEF DESCRIPTION OF THE DRAWINGS

The structure, operation and advantages of the presently disclosed preferred embodiment of the invention will become apparent when consideration of the following description taken in conjunction with the accompanying drawings wherein.

DETAILED DESCRIPTION OF THE INVENTION

Figure 5:
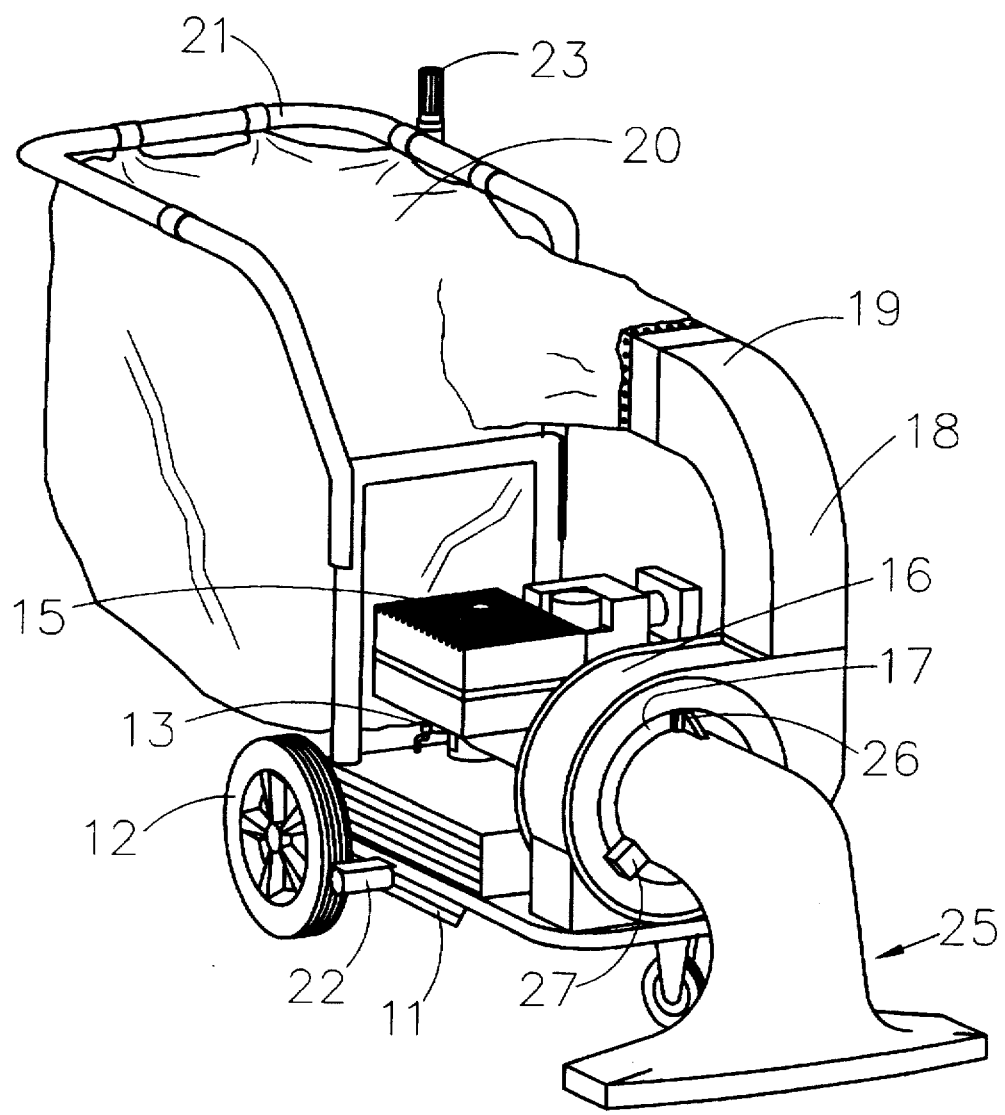
FIG. 5 is a perspective of a MTD Model 685 multi-vac incorporating the invention.

This invention relates to a vacuum nozzle or head 10 for use a vacuum or sweeper. The nozzle 10 will be described in the atmosphere of a MTD Yard Machines Model 685 multi-vac, the nature of which is incorporated by reference. This multi-vac includes a frame 11, wheels 12, a height control lever 13, an engine 15, a fan/suction mechanism 16, a collection bag 20, handlebars 21 and a wheel drive 22 (FIG. 5).

The frame 11 supports and orients the parts of the machine. The particular frame disclosed is a stamped steel generally planar member with integrally formed downwardly extending flanges (for strength and wheel axle support).

The wheels 12 support the frame 11 and the parts interconnected thereto for travel over the ground. In this particular embodiment, three wheels are shown, with the leading single turning wheel being manipulated in respect to the frame 11 by a rearward rotating height adjustment lever 13 in order to adjust the height of the vacuum head in respect to the surface of travel.

The engine 15 is the member which provides the operative power for the device. The the particular embodiment disclosed, this is a five horsepower internal combustion engine.

The fan/suction mechanism 16 is interconnected to the main drive shaft of the engine 15 in order to cause an intense movement of air from the circular inlet 17 to the outlet 18. This creates a suction at the inlet 17 and a jet of air at the outlet 18. The former serves to collect debris while the latter serves to distribute it (although in a purely blower mode the former would not be constructively utilized). The fan/suction mechanism 16 shown is itself a generally cylindrical member having a large multi-bladed fan (not shown) located therein such that rotation of the fan draws the air through the mechanism 16.

Note that the preferred fan/suction mechanism 16 can be rotated about its central longitudinal axis such as to cause the outlet 18 to move to differing positions other than the straight up position shown in the figure. This allows the multi-vac 10 to be utilized as a leaf blower (with a guard replacing the vacuum head 25 over the inlet 17), a leaf displacement mechanism (with the fan/suction mechanism 16 merely being rotated), or otherwise. The mechanism 16 could include a shredder flywheel if desired, with the conversion from vacuum to shredder produced by reversal or replacement of the vacuum head 25. This shredder would reduce the volume of debris in both vacuum and shredding modes. An example shredding mechanism is found in U.S. Pat. No. 3,817,462 incorporated herein.

In the particular embodiment shown in the FIG. 5, a chute 19 interconnects the outlet 18 to a grass collection bag so as to collect the somewhat pulverized debris for remote disposal.

The handlebars 21 allow the operator to manipulate the multi-vac as well as providing a convenient mounting location for the collection bag 20. Note that when the collection bag is at this location it serves to counterbalance the parts of the machine forward of the wheels 12.

The drive 22 is selectively interconnected to the engine 15 so as to cause the multi-vac to move over the ground upon activation of the clutch 23 on the handlebars.

The vacuum head 25 completes the construction of the multi-vac.

In the archtypical multi-vac, this vacuum head 25 has a generally rectangular shaped opening in the bottom surface of the head such that when the head is moved over the ground, yard wastes and other debris get sucked up into a generally rectangular slot for eventual passage through the fan/suction mechanism 16 into the collection bag 20. A typical rectangular slot would be perhaps substantially 30 inches in lateral width and three uniform inches in longitudinal depth, this slot being substantially centered in the bottom area of the vacuum head.

Note that although a specific multi-vac is disclosed, due to the fact that most vacuum head units on suction machines are removable, the invention can be used with many disparate units, whether retrofitting existing units or being specifically incorporated parts on units designed to maximize the invention. This would include units with heads unsymmetrically connected to the fan/suction mechanism. The invention is particularly suitable for the type of construction in which the vacuum head 25 is removably mounted to the fan/suction mechanism (in this and competing units by wing bolts 26, flanges 27, or combinations thereof). This allows increases of effectiveness and efficiency of other units as well.

The invention of the present invention relates to an improved nozzle 30 for use with a vacuum head along with secondary improvements to otherwise increase the efficiency of operation of the vacuum head. In this improved nozzle 30, the vacuum head 25 is modified to direct more air through the side portions of the suction opening 30, displaced from the opening to the fan/suction mechanism 16. Preferably, this is done in consideration with the rest of the unit to substantially equalize the level of suction (i.e. passage of air) all along the lateral width of the suction opening 30. This equalization creates a uniform functioning across the full width of the vacuum head.

In the invention, this modification is preferably accomplished by providing a relative restriction to what would otherwise be faster moving air, this is near the center 32 of the vacuum head in the preferred embodiment shown. This has the effect of the path of least resistance. In the preferred embodiment shown, the movement is to widen the path of least resistance to be substantially equal to the full lateral width of the vacuum head 25.

In the particular preferred embodiment disclosed, the restriction is produced due to the fact that the laterally extending suction slot 30 has a lesser distance 31 at its center 32 (3⅛ inches) than the corresponding distance 35, 37 (4 inches shown) present at either end 36, 38 respectively. The front 41 and back 40 of the vacuum distribution head 25 are, therefore, preferably varied. This differing distance was selected in this preferred embodiment in order to substantially equalize the pressure along the full length of the suction slot 30, this to provide for a substantially equal vacuum along the entire lateral width of the vacuum head 25. With other applications the restriction could modify the suction differently as appropriate.

In the present invention, the differing distances (and thence the restriction) along the lateral width of the slot 30 are created by having the rear section of the vacuum head defining the slot formed into a generally arcuate shape. This shape was designed in recognition of the remaining shape of the vacuum head and the air flow therein so as to provide for the substantially equal suction set forth herein.

Note that the ledge 42 at the back of the slot 30 reinforces this area against flexing (whether due to suction or striking a physical object). It would be possible, if desired, to smoothly merge the back side 43 of the vacuum head 25 into the arcuate shape back edge 40 so as to provide an equal edge all about the suction slot 30 or otherwise as desired. The ledge 42 is preferred for its inherent creation of a secondary plenum immediately above the suction slot 30, thus allowing for a less restricted flow of debris at this location.

Note also that by altering the distances 31, 35 and 37 as well as the shape which accomplishes the change in distances, it would be possible to produce vacuum heads 25 optimized for particular machines and/or particular applications. For example, if the distances 35 and 37 near the ends of the vacuum head were further increased in cross sectional area with the center 32 further decreased, then the ends of the vacuum head would have a higher suction than the center. This would be desirable if the vacuum head 25 were going to be utilized in an application having edge cleaning requirements. Further, the shape of the leading edge 41 of the slot 30 could be varied in concert with or instead of the shape of the rear 40 of the slot, again varying the performance of the particular vacuum head 25. This might be a good modification if lawn debris (such as wet grass or leaves) build up on the trailing edge of the vacuum head due to the length of a single ledge providing the same restriction.

Reinforcing ribs 50 in the top section of the vacuum head 25 reinforce this area so as to reduce and/or eliminate any suction caused puckering or malformation due to any change in suction differential in the vacuum head. By this it is meant that in order to displace the suction outward to the ends 36, 38 of the vacuum head, it is necessary to increase the apparent suction along the lateral width of the vacuum head (in contrast with prior art single dimension slots which would let the air go through the path of least resistance).

Further to the above, a large air plentum 45 near to the immediate fan/vacuum inlet 17 of the multi-vac creates a uniform rather large reservoir of suction, thus serving to aid in equalization of the suction across the lateral width of the vacuum head 25. Further, the plentum 45 operates in conjunction with the reinforcing ribs 50 in order to guide the debris into the center of the inlet, thus further increasing the efficiency of the device.

Figure 1:
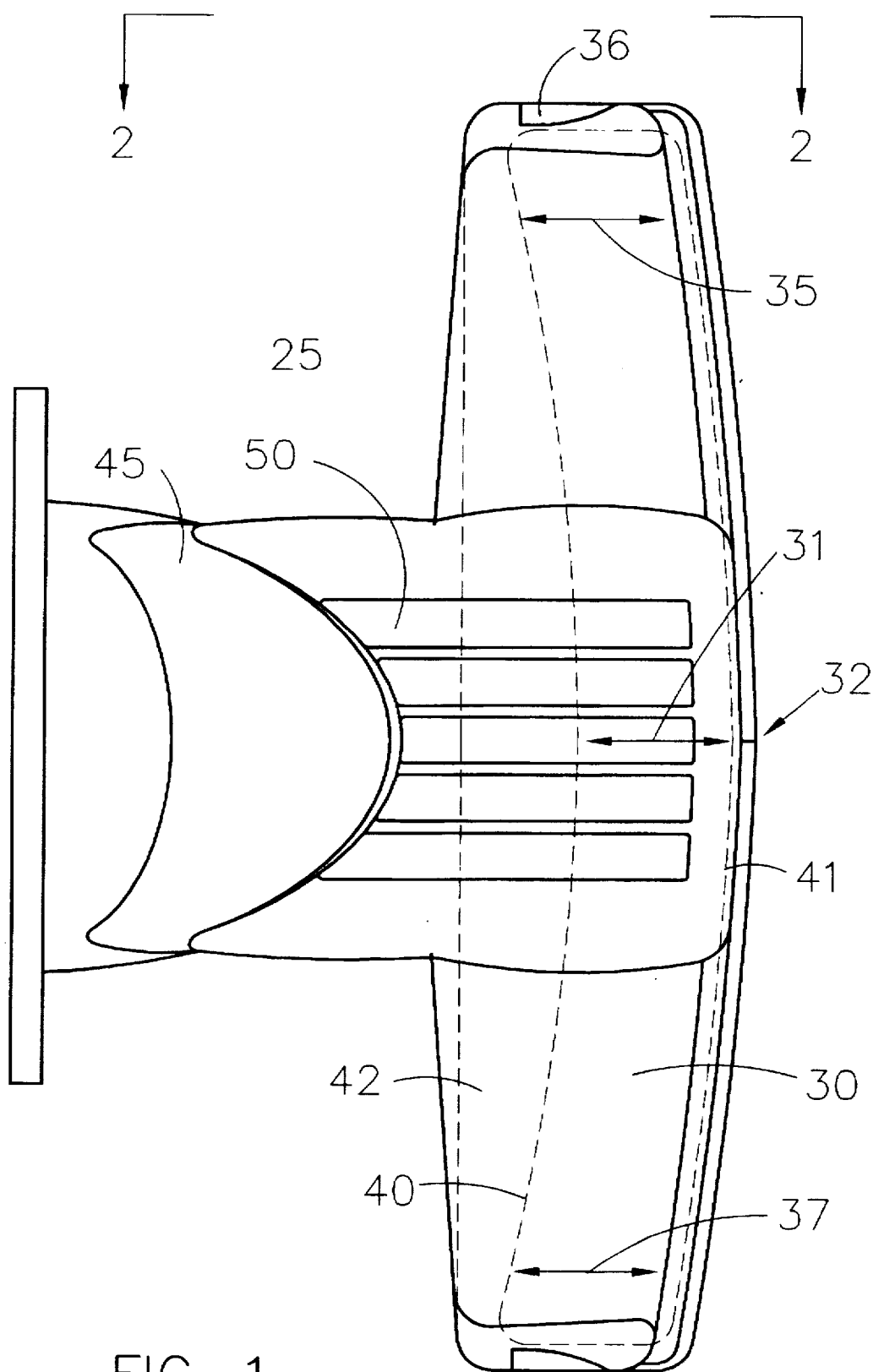
FIG. 1 is a downward view of a vacuum nozzle incorporating the invention of the application.
Figure 2:
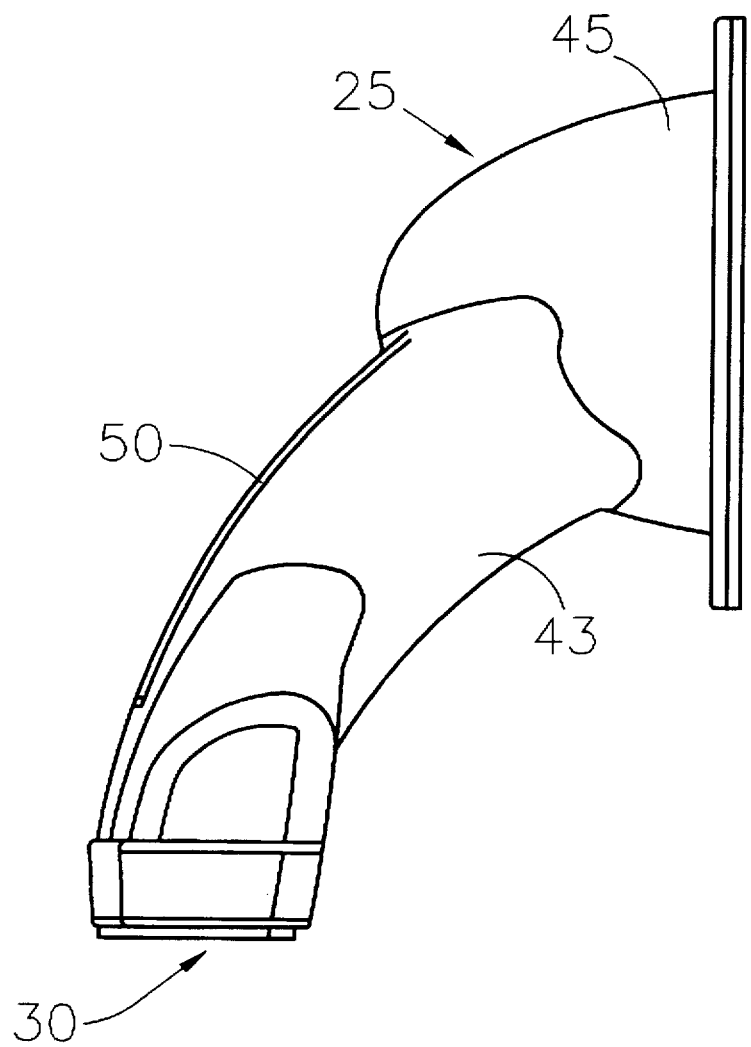
FIG. 2 is a cross sectional view of the vacuum nozzle or head of FIG. 1 taken substantially from lines 2—2 therein.

An improvement to the device would be to mount a separate shutter to the vacuuming head to allow an operator to selectively actively alter the shape of the leading 41 and/or trailing 40 edges of the slot 30 so as to further increase and/or control the suction available through the vacuum head 25. This could be in addition and/or instead of adding a restriction (like altering the shape of the suction slot 30 in FIG. 1) to substantially equalize the pressure along the lateral width between the two ends 36 and 38.

Figure 7:
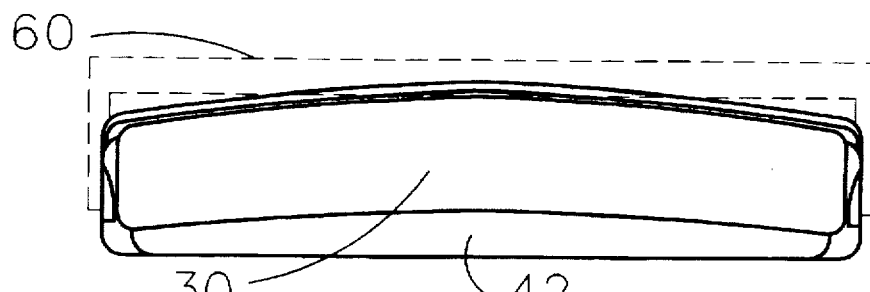
FIGS. 7 and 8 are views of the bottom of a vacuum head showing the operation of FIG. 4's pivot.
Figure 8:
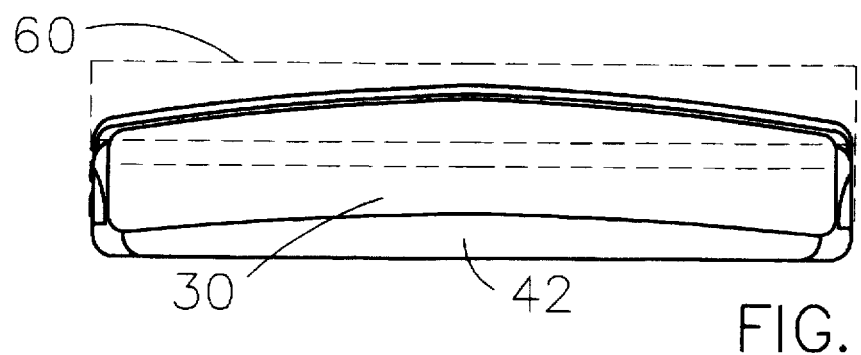
Figure 3:
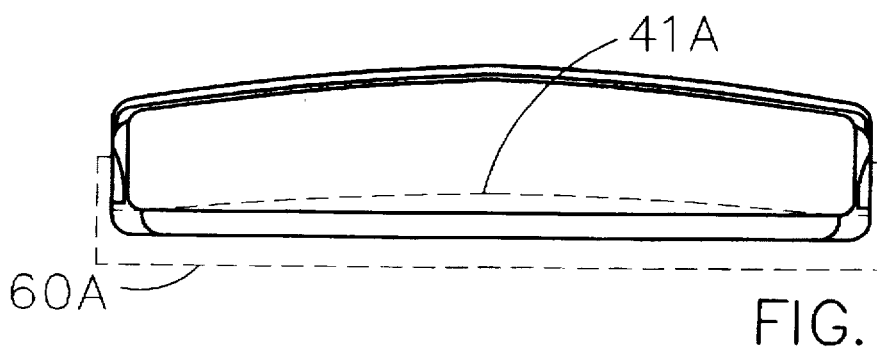
FIG. 3 is a view of the underside of a vacuum nozzle such as that shown in FIG. 1 but incorporating a variable shutter mechanism.
Figure 4:
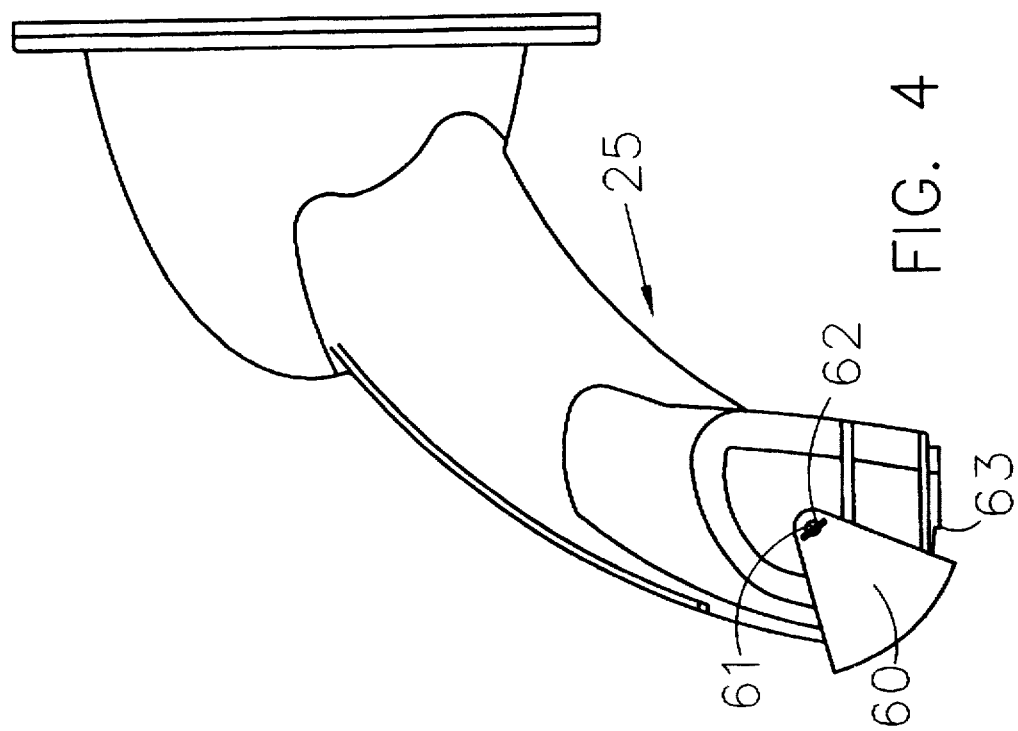
FIG. 4 is a side view of a modification to FIG. 1 showing a pivot mechanism.

In the shutter embodiment disclosed in FIGS. 4, 7 and 8, this shutter is accomplished by having a shutter mechanism 60 rotatively mounted pivot points 61 so as to allow the shutter to decrease the cross sectional area of the suction slot 30 by moving the leading edge progressively backwards. This shutter 60 preferably can be locked in any of its positions. In the embodiment shown in FIG. 4, this locking is accomplished by tightening down a wingnut 62 to engage a dedent mechanism (such as a slot and groove) between the shutter 60 and vacuum head 25. This shutter 60 can be selectively rotated from a position of no effect (FIG. 7) to a number of intermediate positions of varying effect (represented by the two positions shown in FIG. 8—in fact, more positions would be available but for clarity only two are shown). A stop 63 prevents the shutter 60 from closing the slot 30 beyond a certain point, a point at least ascertained to avoid damage to the multi-vac. Preferably, this point is selected to optimize the functioning of the unit at a level above the damage point so as to leave a capacity reserve for the components of the unit—particularly the fan 16 and motor 17. This allows for a lengthened service life (in contrast with a setting nearer the damage point). In this respect, it is noted that the shutter 60 may have a singular linear shape throughout the length of the suction slot 30 between both ends 36 and 38 (FIGS. 7, 8 of) or, like the trailing edge 40 shown, it may be non-linear (to add a varying resistance to the vacuum head—FIGS. 3 and 9). Note that in FIG. 3, the shutter 60A is on the backside of the vacuum head and includes a shape 41A corresponding to the trailing edge 41 of the embodiment of FIG. 1. This embodiment is particularly effective for modifying current devices as both the restriction and shutter are included in a single part. Further, by being located on the trailing part of the device, physical contact with something would drive the shutter backwards, opening the slot 30.

Figure 9:
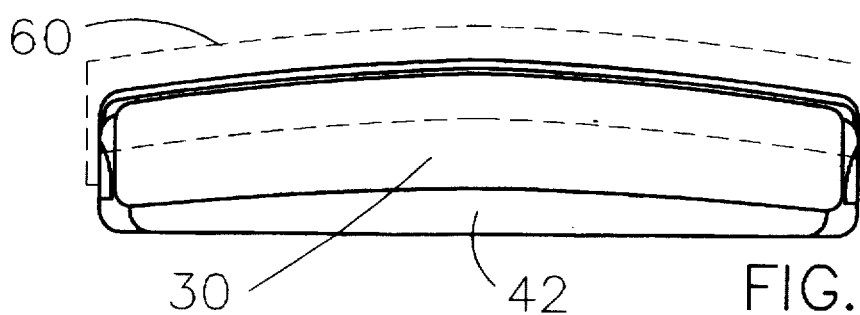
FIGS. 9 and 10 are alternate designs for shutter mechanisms.

As can be seen in FIGS. 3 and 7–9 on moving the shutter 60, it is possible to modify the cross sectional area of the slot, thus modifying the amount of suction available at such slot. This would allow the consumer for example to utilize less suction (for example when picking up light, dry leaves) or more suction (for example when picking up heavy gravel on concrete). This would further increase the adaptability of the device. The shutter 60' of FIG. 9 is an alternate embodiment of the invention in which the shutter 60' is curved in shape.

Although the invention has been described as preferred form with a certain degree of particularity, it is to be understood that numerous changes can be made without deviating from the invention as hereinafter claimed.

Figure 10:
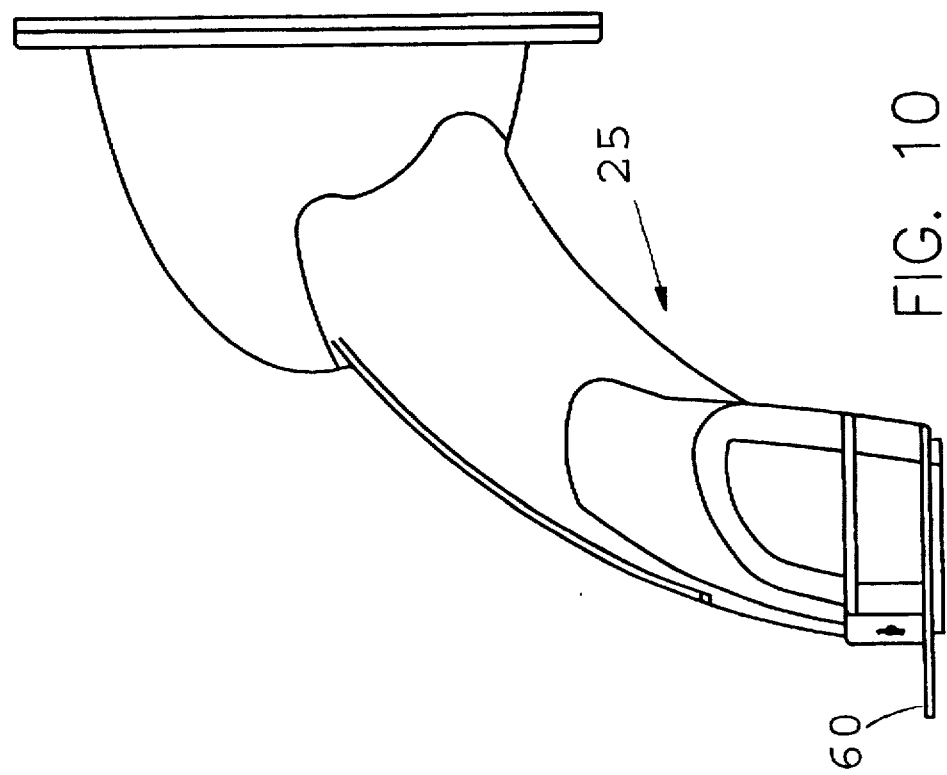
Figure 6:
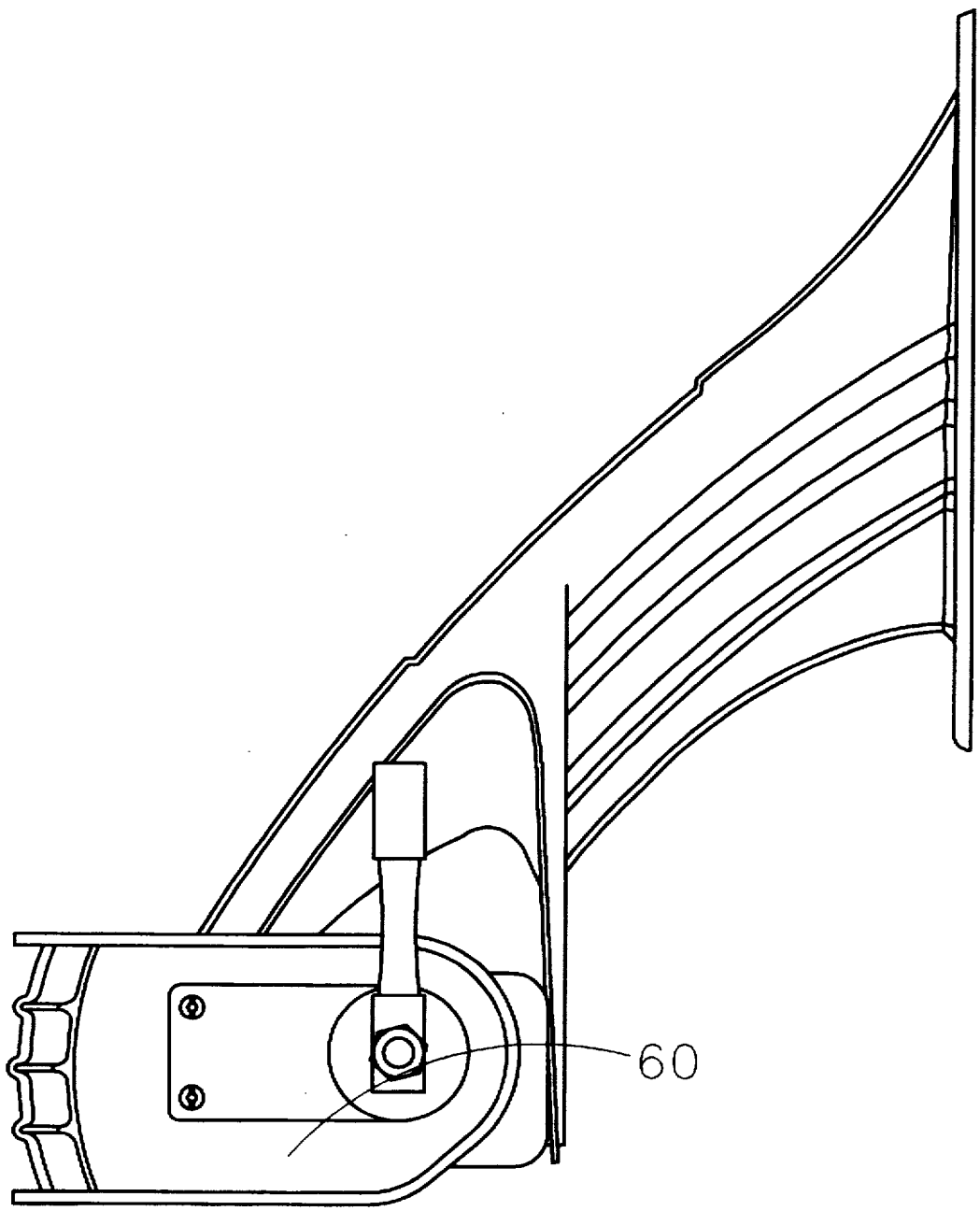
FIG. 6 is a view similar to FIG. 4 showing the side view of a modified vacuum head with a differing shutter mechanism.

For example, although the invention is disclosed in a symmetrical center fan intake device, it could be utilized in an asymmetrical intake device such as a side intake device. Further, although a pivoting shutter is disclosed, a sliding (FIG. 10) or other shutter could be utilized (with or without an integral restriction similar to FIG. 3). Also, other locking mechanisms could be used. For example, in the heavier duty vacuum head version of FIG. 6, a spring loaded lever may be moved outwards against spring tension to allow free rotation of the shutter from dedent to dedent. Other changes are also possible without departing from the invention as claimed.

I claim:

1. In a lawn vacuum having a motor driven collection fan with an inlet opening and a vacuum distribution head connected thereto, the vacuum distribution head having a laterally disposed opening, the improvement of a restriction, said restriction being located in the vacuum distribution head, the opening having lateral ends on each side of a center of the opening and characterized in that said restriction reduces from the center to the ends of the opening, means for said restriction to modify the vacuum of the laterally disposed opening, and characterized in that the vacuum distribution head having a front and a back and at least one of the front and back being varied to provide said restriction.

2. The lawn vacuum of claim 1 wherein the opening has a fore-and-aft distance and characterized in that said means for said restriction to modify the vacuum of the laterally disposed opening includes varying the fore-and-aft distance of the opening along the length of the opening.

3. The lawn vacuum of claim 2 wherein the lower opening has lateral ends on each side of the center and characterized in that the fore-and-aft distance substantially increases from the center to the ends of the lower opening.

4. The lawn vacuum of claim 3 wherein the lower opening has longitudinally extending leading and trailing edges and the trailing edge being varied to increase the fore-and-aft distance from the center to the ends of the lower opening.

5. The lawn vacuum of claim 2 characterized by the addition of a shutter, means to movably connect said shutter to the vacuum head and selective movement of said shutter altering the fore-and-aft distance of the lower opening.

6. In a lawn vacuum having a motor driven collection fan with an inlet opening and a vacuum distribution head connected thereto, the vacuum distribution head having a laterally disposed lower opening having a fore-and-aft distance, the improvement of the fore-and-aft distance varying along the length of the laterally disposed lower opening, the improvement further characterized by the lower opening having lateral ends on each side of a center and characterized in that the fore-and-aft distance substantially increases from the center to ends of the lower opening.

7. The lawn vacuum of claim 6 characterized in that the fore-and-aft distance substantially continuously increases from the center to the ends of the lower opening.

8. The lawn vacuum of claim 6 wherein the lower opening has longitudinally extending leading and trailing edges and the trailing edge being varied to increase the fore-and-aft distance from the center to the ends of the lower opening.

9. The lawn vacuum of claim 8 characterized by the addition of a shutter, means to movably connect said shutter to the vacuum head and selective movement of said shutter altering the fore-and-aft distance of the lower opening.

10. The lawn vacuum of claim 6 characterized by the addition of a shutter, means to movably connect said shutter to the vacuum head and selective movement of said shutter altering the fore-and-aft distance of the lower opening.

* * * * *